(12) United States Patent
Kleinpenning et al.

(10) Patent No.: US 11,451,134 B2
(45) Date of Patent: Sep. 20, 2022

(54) METHOD AND DEVICE FOR DISCHARGING OUTPUT CAPACITOR OF POWER SUPPLY

(71) Applicant: NXP B.V., Eindhoven (NL)

(72) Inventors: Jeroen Kleinpenning, Malden (NL); Jacobus Govert Sneep, Bavel (NL); Tsung-Pin Tang, New Taipei (TW)

(73) Assignee: NXP B.V., Eindhoven (NL)

( * ) Notice: Subject to any disclaimer, the term of this patent is extended or adjusted under 35 U.S.C. 154(b) by 298 days.

(21) Appl. No.: 16/435,380

(22) Filed: Jun. 7, 2019

(65) Prior Publication Data

US 2020/0389083 A1 Dec. 10, 2020

(51) Int. Cl.
*H02M 1/32* (2007.01)
*H02M 3/335* (2006.01)

(52) U.S. Cl.
CPC ......... *H02M 1/32* (2013.01); *H02M 3/33592* (2013.01); *H02M 1/322* (2021.05)

(58) Field of Classification Search
CPC ..... H02M 1/32; H02M 3/33592; H02M 1/322
See application file for complete search history.

(56) References Cited

U.S. PATENT DOCUMENTS

| | | | |
|---|---|---|---|
| 9,755,638 B2 | 9/2017 | Dhamdhere et al. | |
| 9,837,917 B1 | 12/2017 | Furtner et al. | |
| 10,063,073 B2 | 8/2018 | Yao et al. | |
| 2009/0016083 A1* | 1/2009 | Soldano | H02M 3/33592 363/20 |
| 2015/0049529 A1* | 2/2015 | Iorio | H02M 3/33507 363/89 |
| 2015/0131329 A1* | 5/2015 | Chen | H02M 1/08 363/17 |
| 2015/0222173 A1 | 8/2015 | Malinin | |
| 2016/0226389 A1* | 8/2016 | Quaglino | H02M 3/33592 |
| 2018/0097447 A1* | 4/2018 | Iorio | H03K 17/163 |
| 2018/0183343 A1* | 6/2018 | Ausseresse | H02M 3/33576 |
| 2019/0068071 A1* | 2/2019 | Jia | H02M 3/33507 |
| 2019/0149056 A1 | 5/2019 | Zheng et al. | |

FOREIGN PATENT DOCUMENTS

EP 3258585 A1 12/2017

* cited by examiner

*Primary Examiner* — Jue Zhang

(57) ABSTRACT

Embodiments of a method and a device are disclosed. In an embodiment, a method for discharging an output capacitor of a power supply is disclosed. The power supply includes a primary side for receiving a signal to be converted and a secondary side for outputting a converted signal. The method involves detecting whether synchronous rectification (SR) circuitry at the secondary side is inactive, determining that the primary side is disconnected from a mains voltage when the SR circuitry is detected to be inactive, and discharging an output capacitor at the secondary side based on the determination that the primary side is disconnected from the mains voltage.

22 Claims, 7 Drawing Sheets

METHOD AND DEVICE FOR DISCHARGING OUTPUT CAPACITOR OF POWER SUPPLY

BACKGROUND

A power supply is an electrical device that supplies electric power to an electrical load. The primary function of a power supply is to convert electric voltage and current from a source to the correct voltage and current to power the load. As a result, power supplies are sometimes referred to as electric power converters.

Power supplies can use a mains voltage as an energy source. For safety and logic handling reasons, disconnecting a power supply from the mains voltage should logically lead to zero output voltage. A disconnected power supply may be expected to provide zero output voltage within a short time such that the converter can be handled/touched and/or a short of an output node cannot cause an unexpected overcurrent situation by a sudden discharge of an output capacitor. The power supply may include a power indicator that should turn off within a few seconds of the power supply being disconnected from the mains voltage. This allows for unambiguous logic operation and avoids repetitive turning-on and turning-off of the power supply because the power indicator presents a power present signal while a voltage input is disconnected.

SUMMARY

Embodiments of a method and a device are disclosed. In an embodiment, a method for discharging an output capacitor of a power supply is disclosed. The power supply includes a primary side for receiving a signal to be converted and a secondary side for outputting a converted signal. The method involves detecting whether synchronous rectification (SR) circuitry at the secondary side is inactive, determining that the primary side is disconnected from a mains voltage when the SR circuitry is detected to be inactive, and discharging an output capacitor at the secondary side based on the determination that the primary side is disconnected from the mains voltage.

In an embodiment of the method, the primary side is determined to be disconnected from the mains voltage when the SR circuitry performs no switching activity for a predetermined duration.

In an embodiment of the method, discharging the output capacitor comprises detecting an amount of time that the SR circuitry performs no switching activity, and discharging the output capacitor when the amount of time exceeds a threshold.

In an embodiment of the method, the output capacitor is discharged by a constant power load.

In an embodiment of the method, the output capacitor is discharged by a constant current load.

In an embodiment of the method, the output capacitor is discharged by a resistor load.

In an embodiment of the method, the output capacitor is discharged by at least one of a power load, a current load, a resistor load, or any combination thereof.

In an embodiment of the method, a current for discharging the output capacitor decreases at a high junction temperature.

An embodiment of a power supply is disclosed. The power supply includes a primary side configured to connect to a mains voltage and receive a voltage signal to be converted, a secondary side configured to output a converted voltage signal, and a transformer connected between the primary side and the secondary side and configured to convert the voltage signal. The secondary side includes an output capacitor, synchronous rectification (SR) circuitry configured to rectify the converted voltage signal from the transformer, detection circuitry configured to detect whether the SR circuitry is inactive, determining circuitry configured to determine that the primary side is disconnected from the mains voltage when the SR circuitry is detected to be inactive, and discharging circuitry configured to discharge the output capacitor based on the determination that the primary side is disconnected from the mains voltage.

In an embodiment of the power supply, the determining circuitry is configured to determine that the primary side is disconnected from the mains voltage when the SR circuitry performs no switching activity for a predetermined duration.

In an embodiment of the power supply, the discharging circuitry is configured to detect an amount of time that the SR circuitry performs no switching activity, and discharge the output capacitor when the amount of time exceeds a threshold.

In an embodiment of the power supply, the output capacitor is discharged by a constant power load.

In an embodiment of the power supply, the output capacitor is discharged by a constant current load.

In an embodiment of the power supply, the output capacitor is discharged by a resistor load.

In an embodiment of the power supply, the output capacitor is discharged by at least one of a power load, a current load, a resistor load, or any combination thereof.

In an embodiment of the power supply, a current for discharging the output capacitor decreases at a high junction temperature.

Another embodiment of a power supply is disclosed. The power supply includes a primary side configured to connect to an input voltage and receive a voltage signal to be converted and a secondary side configured to output a converted voltage signal. The secondary side includes a controller configured to detect whether synchronous rectification (SR) circuitry at the secondary side is inactive, determine that the primary side is disconnected from the input voltage when the SR circuitry is detected to be inactive, and discharge an output capacitor at the secondary side based on the determination that the primary side is disconnected from the input voltage.

In an embodiment of the power supply, the controller is configured to determine that the primary side is disconnected from the input voltage when the SR circuitry performs no switching activity for a predetermined duration.

In an embodiment of the power supply, the controller configured to discharge the output capacitor is further configured to detect an amount of time that the SR circuitry performs no switching activity, and discharge the output capacitor when the amount of time exceeds a threshold.

In an embodiment of the power supply, the controller is configured to discharge the output capacitor by at least one of a power load, a current load, a resistor load, or any combination thereof.

Other aspects in accordance with the invention will become apparent from the following detailed description, taken in conjunction with the accompanying drawings, illustrated by way of example of the principles of the invention.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
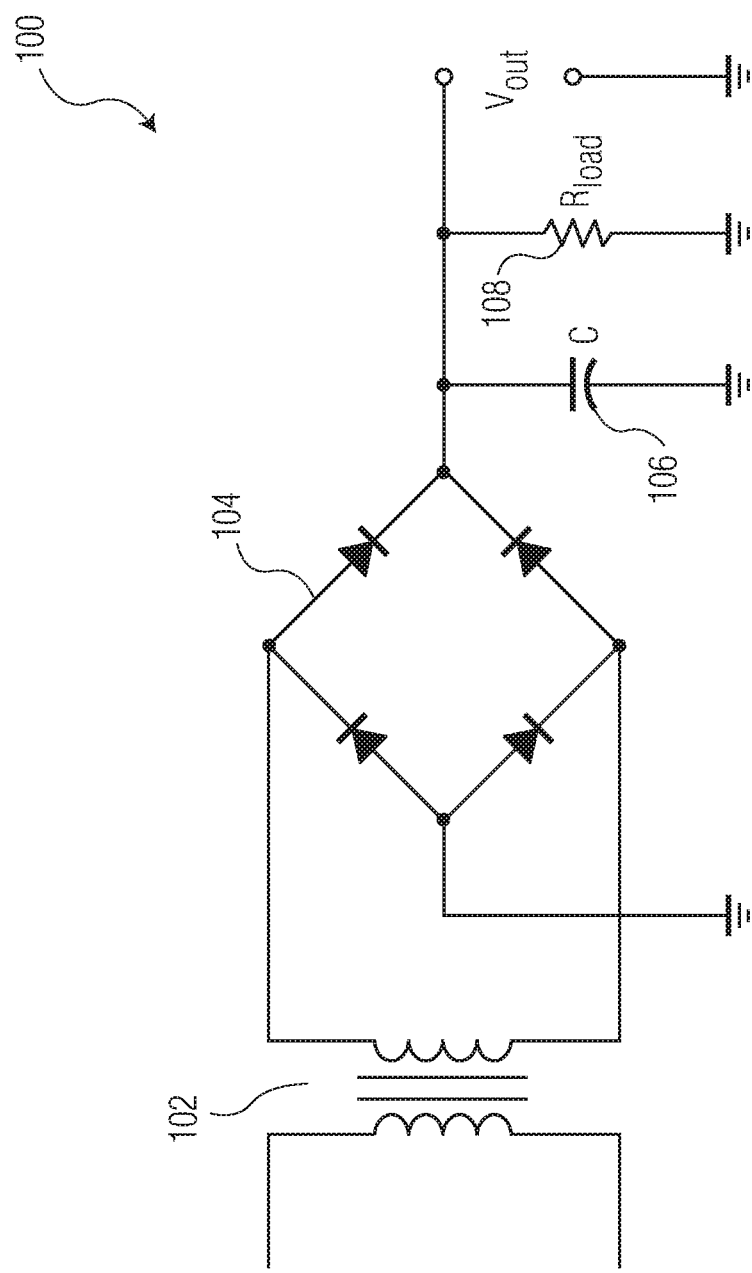
FIG. 1 depicts an example of a rudimentary AC-to-DC power supply.

FIG. 1 depicts an example of a rudimentary AC-to-DC power supply 100 with mains-isolation. The power supply 100 includes a transformer 102 for the mains-isolation and voltage conversion, a full-wave bridge rectifier 104, a storage capacitor 106, and a resistor load 108. In the example power supply 100, AC mains voltage (e.g., 120 V at 60 Hz) is used as a voltage input (energy source). The transformer 102 is used to convert the input voltage to a higher or lower AC voltage. The rectifier 104 is then employed to convert the transformer output voltage to a rectified DC voltage. The DC voltage is peak-rectified by the storage capacitor 106 and the resistor load 108 to be converted into an unregulated DC voltage (Vout).

The storage capacitor 106 removes a large part of the periodic AC voltage variations. A remaining AC voltage is known as ripple. An electric load's tolerance of ripple may dictate a minimum amount of filtering to be provided by the power supply 100. In some embodiments, high ripple is tolerated and therefore no filtering is required. For example, in some basic applications, a mains-powered DC power supply may be implemented with a transformer, a single rectifier diode, and a resistor in series with an output node to limit charging current.

Figure 2:
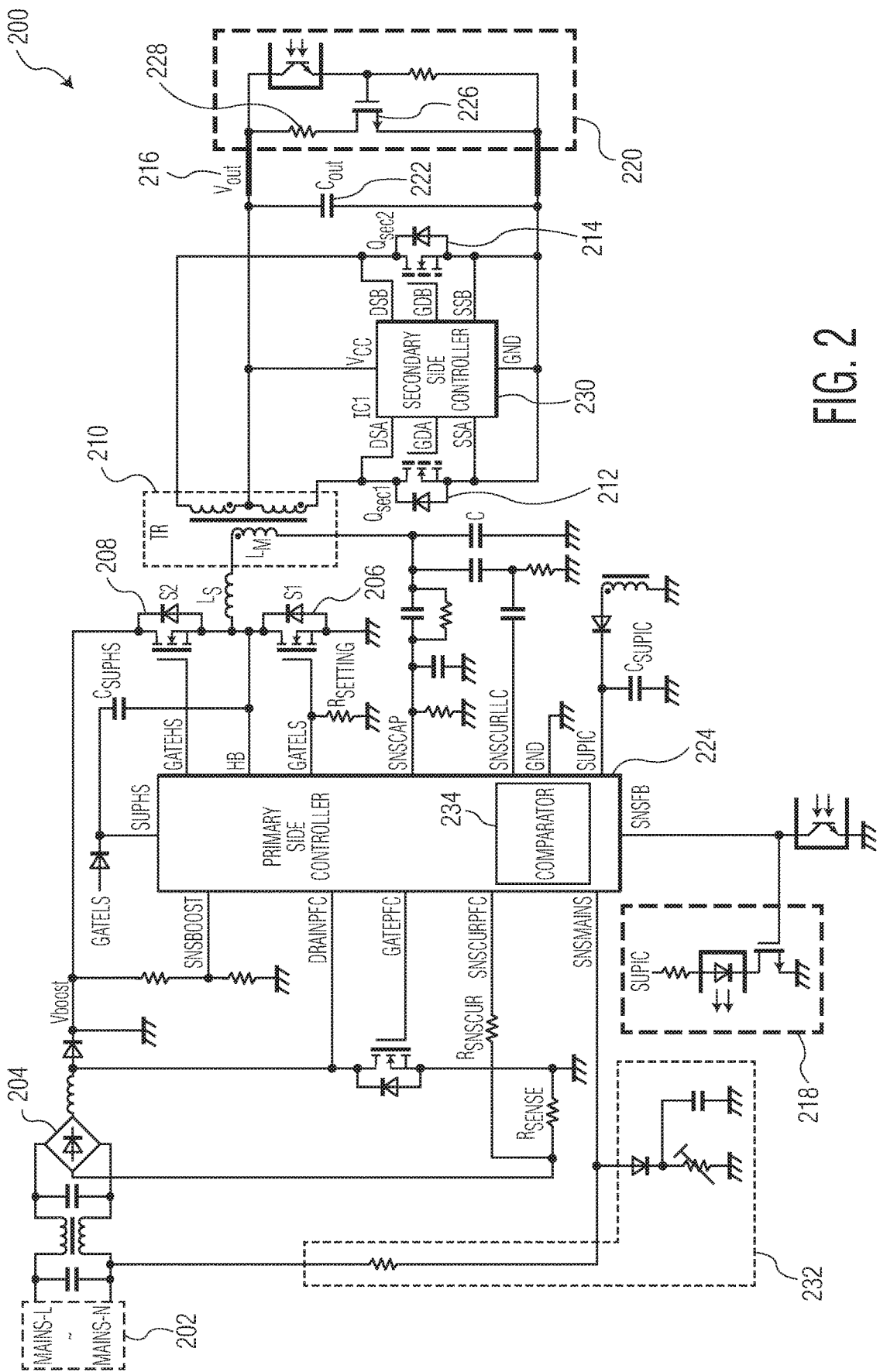
FIG. 2 depicts a switched-mode power supply (SMPS) utilizing a conventional method for output capacitor discharge after AC mains disconnect.

FIG. 2 depicts a switched-mode power supply (SMPS) 200 utilizing a conventional method for output capacitor discharge after AC mains disconnect. In the SMPS 200, the AC mains input 202 is directly rectified by a rectifier 204 and then filtered to obtain a DC voltage. The resulting DC voltage is then switched on and off at a high frequency by electronic switching circuitry (e.g., switch S1 206 and switch S2 208), thus producing an AC current that will pass through a primary winding of a transformer 210. Switching occurs at a very high frequency (e.g., 20 kHz to 1 MHz), thereby enabling the use of transformers and filter capacitors that are much smaller, lighter, and less expensive than those found in power supplies operating at mains frequency. The current passing through a secondary winding of the transformer 210 is rectified by synchronous rectification (SR) switching circuitry (e.g., switch Qsec1 212 and switch Qsec2 214) and filtered to produce a DC output voltage Vout 216. The SR switching circuitry may be controlled by a secondary side controller 230, which may be embodied as a standalone integrated circuit (IC) device. If the SMPS 200 uses an adequately insulated high-frequency transformer 210, the output voltage Vout 216 will be electrically isolated from the mains input 202, which may be essential for safety.

In general, electrical components that connect to an input of the transformer 210 may be referred to as a primary side of the SMPS 200 because the main electrical power to be changed is connected at this point. The electrical components of the primary side may be controlled by a primary side controller 224. Electrical components that connect to an output of the transformer 210 may be referred to as a secondary side of the SMPS 200. The secondary side is where the electrical power is sent to the load. The electrical components of the secondary side may be controlled by the secondary side controller 230.

The SMPS 200 uses a voltage divider and a comparator at the primary side to first detect an AC mains voltage disconnect and then to enable, via an opto-coupler 218, a resistive discharge circuit 220 at the secondary side to discharge an output capacitor Cout 222. For example, as shown in FIG. 2, the voltage divider 232 is connected to the Mains-N voltage and the comparator 234 is incorporated within the primary side controller 224. The comparator 234 receives a signal from the voltage divider 232 via an SNSMAINS input and determines whether the primary side is disconnected from the AC mains voltage. If disconnected, the primary side controller 224 sends, via an SNSFB output, a discharge signal to the opto-coupler 218. The opto-coupler 218 then outputs a discharge signal (e.g., by emitting light) that is received by the resistive discharge circuit 220 at the secondary side to enable discharging of the output capacitor Cout 222. For example, the output of the opto-coupler 218 turns on an NMOS discharge switch 226 at the secondary side. The discharge may occur via a resistor 228 in series with the NMOS discharge switch 226.

In some aspects, a charged output capacitor, such as the output capacitor Cout 222, is problematic because it may shock a user when touched and/or cause too high of a current (i.e., overcurrent) at an output when short circuited. The problem may be exacerbated when the output capacitor remains charged for a long period when no load is connected, and therefore, no discharge current is present. Previous attempts to discharge the output capacitor upon the power supply's disconnect from the AC mains voltage include use of an opto-coupler (e.g., the opto-coupler 218) for sending a discharge enabling signal from the primary side of the power supply to discharging circuitry (e.g., resistive discharge circuit 220) at the secondary side of the power supply. However, use of such an opto-coupler may occupy valuable device area and add cost to the power supply.

Accordingly, what is needed is a power supply that detects the mains voltage disconnect at the secondary side of the power supply without a communication signal from the primary side, which eliminates the need for the opto-coupler. In an embodiment, a method for discharging an output capacitor of a power supply is provided. The power supply includes a primary side for receiving a signal to be converted and a secondary side for outputting a converted signal. The method includes detecting whether synchronous rectification (SR) circuitry at the secondary side is inactive, determining that the primary side is disconnected from the mains voltage when the SR circuitry is detected to be inactive, and discharging an output capacitor at the secondary side based on the determination that the primary side is disconnected from the mains voltage. For example, detection of the mains voltage disconnect occurs by monitoring synchronous rectification activity at the secondary side of a power supply and defining a time threshold for discriminating between no-load operation and power disconnect. In an embodiment, a discharge function discharges with a constant power. As such, rapid capacitor discharging with constant power dissipation within a controller at the secondary side of the power supply is provided. In an embodiment, the time threshold may be an observed waiting time after the mains voltage disconnect that avoids an increase of standby power by the discharge function. The constant power discharge activates after the time threshold and can facilitate fast capacitor discharging and a fast turning-off of the power indicator.

Figure 3:
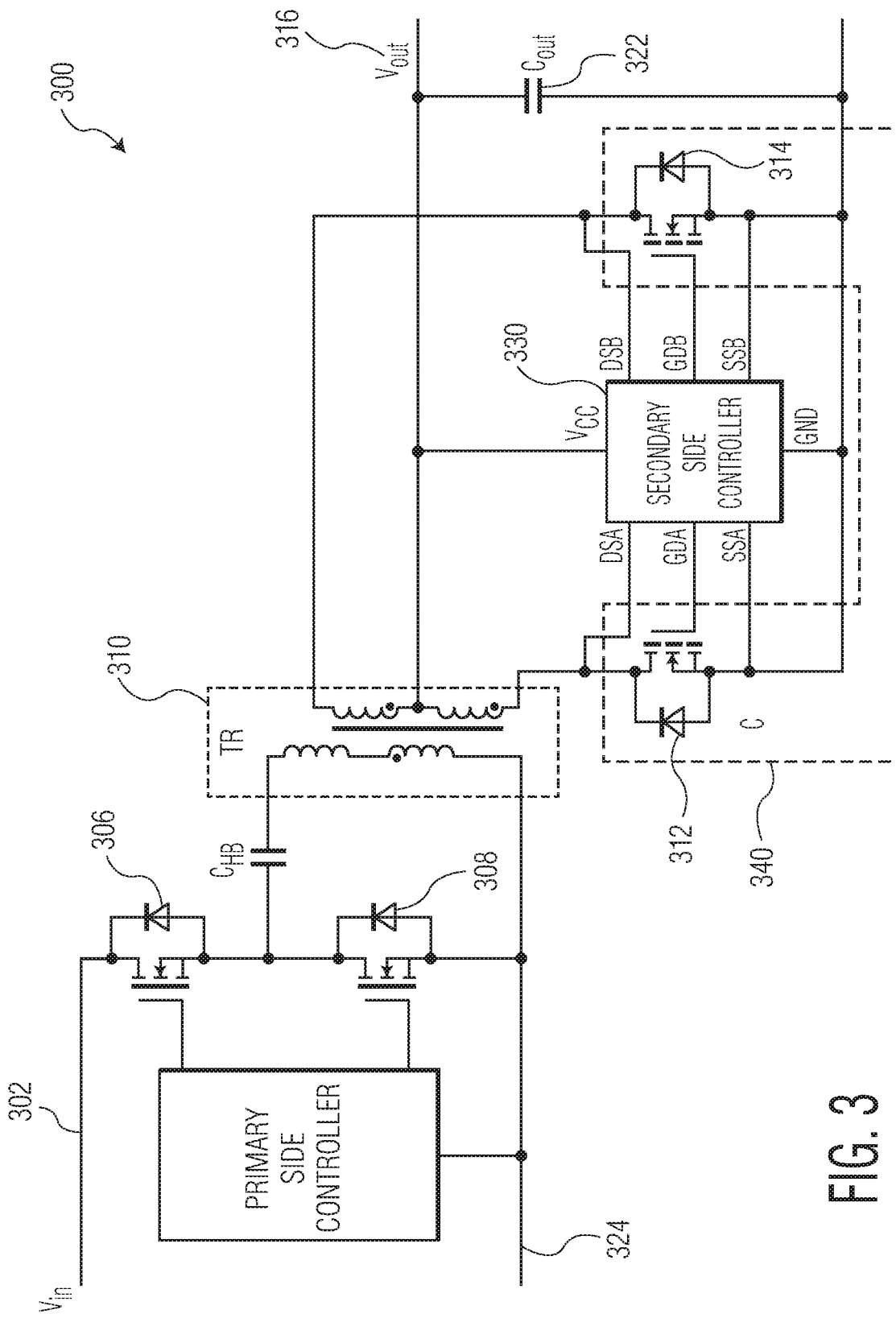
FIG. 3 depicts a switched-mode power supply (SMPS) utilizing automatic output capacitor discharge after AC mains disconnect.

FIG. 3 depicts a switched-mode power supply (SMPS) 300 utilizing automatic output capacitor discharge after AC mains disconnect. In the SMPS 300, an AC mains voltage input may be rectified and filtered to obtain a DC voltage Vin 302. The DC voltage Vin 302 is then switched on and off at a high frequency by electronic switching circuitry (e.g., switch 306 and switch 308), thus producing an AC current that will pass through a transformer 310. Each of the switches 306 and 308 may be, for example, a field effect transistor (FET) or metal-oxide semiconductor field-effect transistor (MOSFET) with an incorporated body-diode. The electrical switching circuitry may be controlled by a primary side controller 324. After the transformer 310, the AC is rectified by synchronous rectification (SR) switching circuitry 340 (e.g., switch 312 and switch 314) and filtered via output capacitor Cout 322 to produce a DC output voltage Vout 316. Each of the switches 312 and 314 may be, for example, a FET or MOSFET with an incorporated body-diode. The SR switching circuitry 340 may be controlled by a secondary side controller 330, which may be a standalone integrated circuit (IC) device. The second side controller may include supply voltage input (Vcc), a drain sense input for synchronous timing MOSFET A (DSA), a drain sense input for synchronous timing MOSFET B (DSB), a gate driver output MOSFET A (GDA), a gate driver output MOSFET B (GDB), a source sense input MOSFET A (SSA), a source sense input MOSFET B (SSB), and a ground (GND).

In an embodiment, a discharge function for discharging the output capacitor Cout 322 may be executed via a detection circuit configured to detect SR activity, a timing circuit having a long time constant, and a discharge circuit configured to control a dissipated power. In an embodiment, the detection circuit, the timing circuit, and the discharge circuit may all be implemented within the secondary side controller 330, thus eliminating the need for additional components such as the opto-coupler 218 of FIG. 2.

Figure 4:
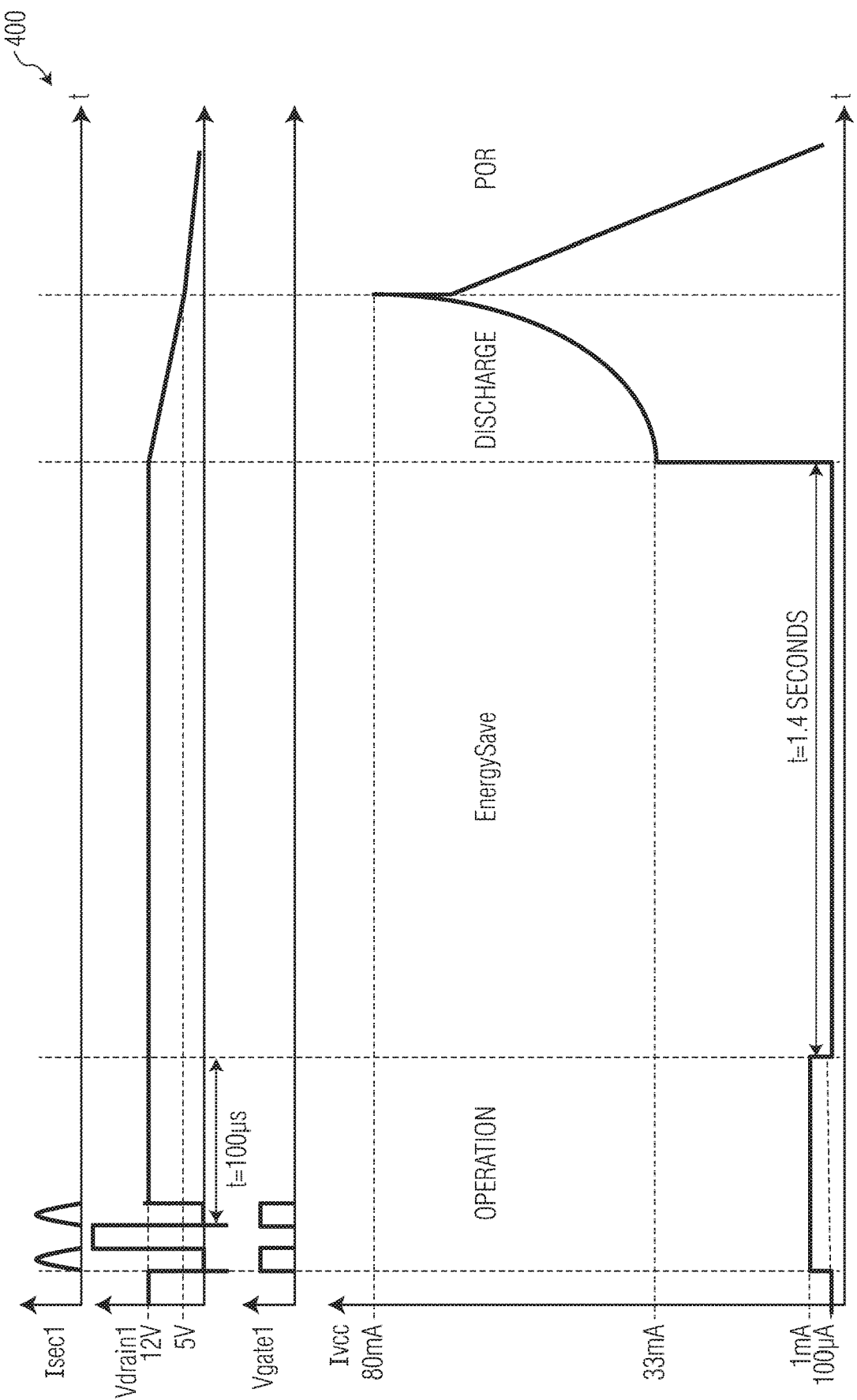
FIG. 4 is a diagram illustrating a capacitor discharge function operation and relevant waveforms.

FIG. 4 is a diagram 400 illustrating a capacitor discharge function operation and relevant waveforms. During normal operation of a power supply, a secondary current Isec1 (e.g., current output from the transformer 310) flows to an output node (e.g., Vout 316) and a SR controller (e.g., secondary side controller 330) senses the drain voltages (Vdrain1) of the rectification switches (e.g., switch 312 and switch 314). As shown in FIG. 4, at a negative drain voltage Vdrain1, the SR controller may turn on a gate voltage (Vgate1) of a synchronous rectification switch for the synchronous rectification with a low voltage drop and low rectification losses.

In normal operation of the power supply, a current that flows into a supply voltage (Vcc) node at the secondary side (Ivcc) may have a magnitude of 1 mA. When no load is connected to the power supply, a controller (e.g., secondary side controller 330) may operate in a burst mode for low standby power. During non-switching portions of the burst, Ivcc can switch to a very low level (e.g., 100 µA) for energy savings. An example time for switching to an energy saving mode may be 100 µs since a cycle time of continuous switching is below the audible border of ½₀ kHz or 50 µs.

In an embodiment, a mains voltage disconnect is detected by the secondary side controller 330 and the synchronous rectification (SR) switching circuitry 340 (e.g., switch 312 and switch 314) stops switching. For example, if the secondary side controller 330 (sensing the drain voltages of the rectification switches) senses no switching activity at the switch 312 or the switch 314 for a defined time (e.g., 1 second), then the secondary side controller 330 may determine that the power supply is disconnected from the mains voltage.

A maximum non-switching time in no-load operation is generally less than 1 second. Moreover, a delay time of the discharge function should be set to be longer than a maximum time of the non-switching portion of the burst mode or of the low frequency mode to avoid triggering the discharge function during the no-load operation. Therefore, the delay time of the discharge function may be longer than 1 second. In an embodiment, if the delay time is determined with 30% accuracy, a delay time of 1.4 seconds would allow ample margin for the limited accuracy.

According to some embodiments, output capacitor discharging may be performed in several ways. For example, the output capacitor may be discharged via a resistive discharge, e.g., the output capacitor is discharged by a resistor load. In another example, the output capacitor is discharged via a constant current discharge. That is, the output capacitor is discharged by a constant current load, which causes a constant decay of the output voltage according to the expression:

$$dV\text{out}/dt = I\text{discharge}/C\text{out}.$$

In a further example, the output capacitor is discharged via a constant power discharge. That is, the output capacitor is discharged by a constant power load, which causes constant power dissipation for rapid and temperature independent discharge. In yet another example, the output capacitor is discharged via a constant temperature discharge. Here, a temperature at a discharge transistor is kept constant in order to discharge the output capacitor. Such a technique is rapid but may require temperature sensing, e.g., within the discharge transistor.

In an embodiment, an allowed power dissipation is determined by a thermal resistance from an internal discharge circuit to the outside ambient environment. For example, a generally used package for a SR controller at the secondary side of a power supply, such as an LLC converter, has a typical thermal resistance from junction to ambient environment Rth(j-a) of 140 Kelvin per Watt (K/W). A specified maximum ambient temperature is 85° C. and a maximum junction temperature is 150° C. In an embodiment, the allowed power dissipation by a discharge function incorporated in the package, including some margin for tolerances, is 0.4 W. The constant power discharge for 0.4 W is depicted in FIG. 5.

Figure 5:
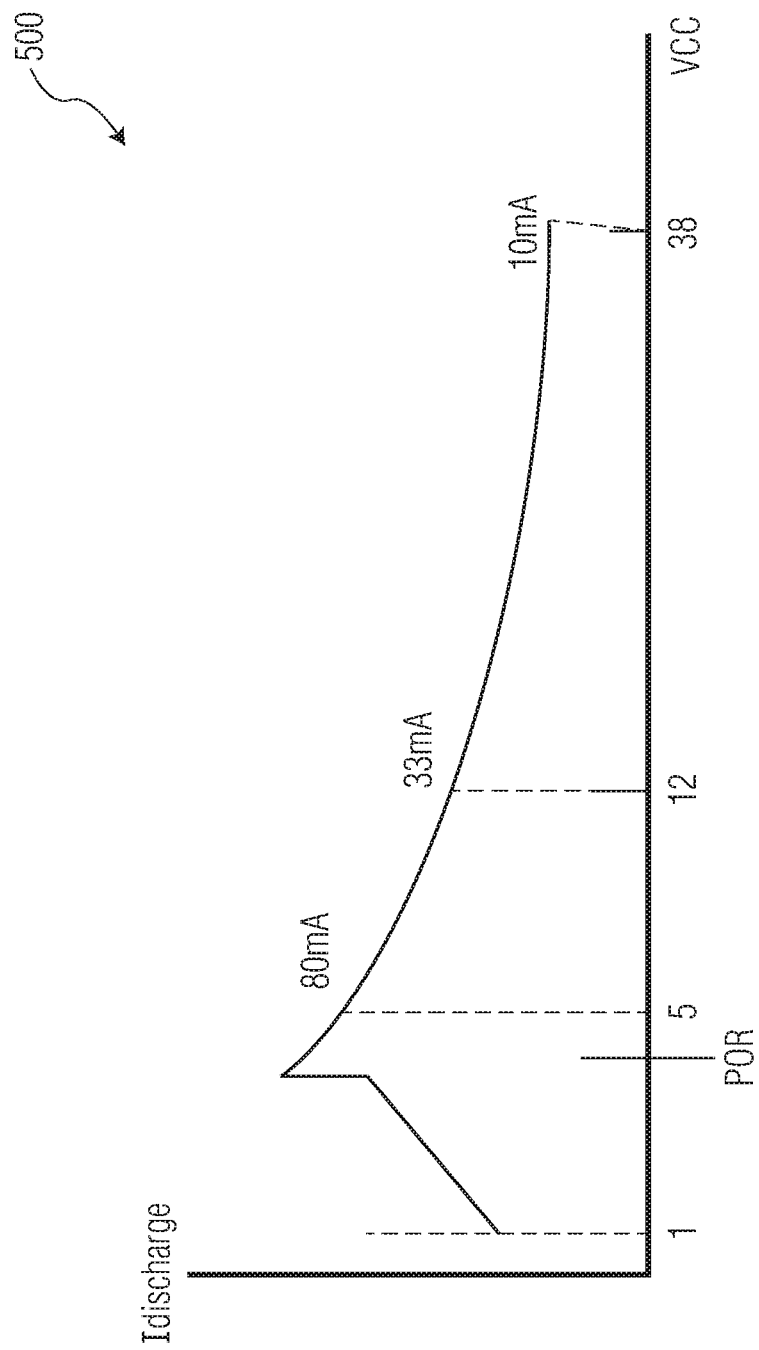
FIG. 5 is a graph of discharge current versus voltage that illustrates constant power discharge until Power-On-Reset (POR).

FIG. 5 is a graph 500 of discharge current versus voltage that illustrates constant power discharge until Power-On-Reset (POR). In an embodiment, a control scheme that enables constant power discharge for an output voltage and IC supply voltage above a POR voltage level may no longer operate properly when the output voltage and IC supply voltage fall below the POR voltage level. As such, the discharge may continue by using, for example, a constant current load or a resistive load of a different control scheme that can enable discharge when the output voltage and IC supply voltage decrease below the POR voltage level and until a minimum voltage level (e.g., below 1 V) is reached.

A formula for determining a discharge time (Tdischarge) may be based on the energy content. For example, Tdischarge may be determined according to the following expression (neglecting a discharge operation below the POR voltage level):

$$T\text{discharge} = (\frac{1}{2} \cdot C\text{out} \cdot V\text{out}^2)/P\text{discharge}.$$

As an example, the discharging of a 10 mF output capacitor of a 12 V power converter at a constant power discharge of 0.4 W may be performed in 1.8 seconds: Tdischarge=(½*0.01 F*(12 V)²)/0.4 W=0.72 J/0.4 W=1.8 seconds.

The discharge current will flow at startup. If the power supply is disconnected from the mains voltage during startup, the output capacitor will automatically discharge quickly. The current that charges the output capacitor at startup may be more than 20 A for charging a typical capacitance of 10 mF from 0 V to 12 V within 6 milliseconds. Such a current facilitates the design and avoids an additional state.

Figure 6:
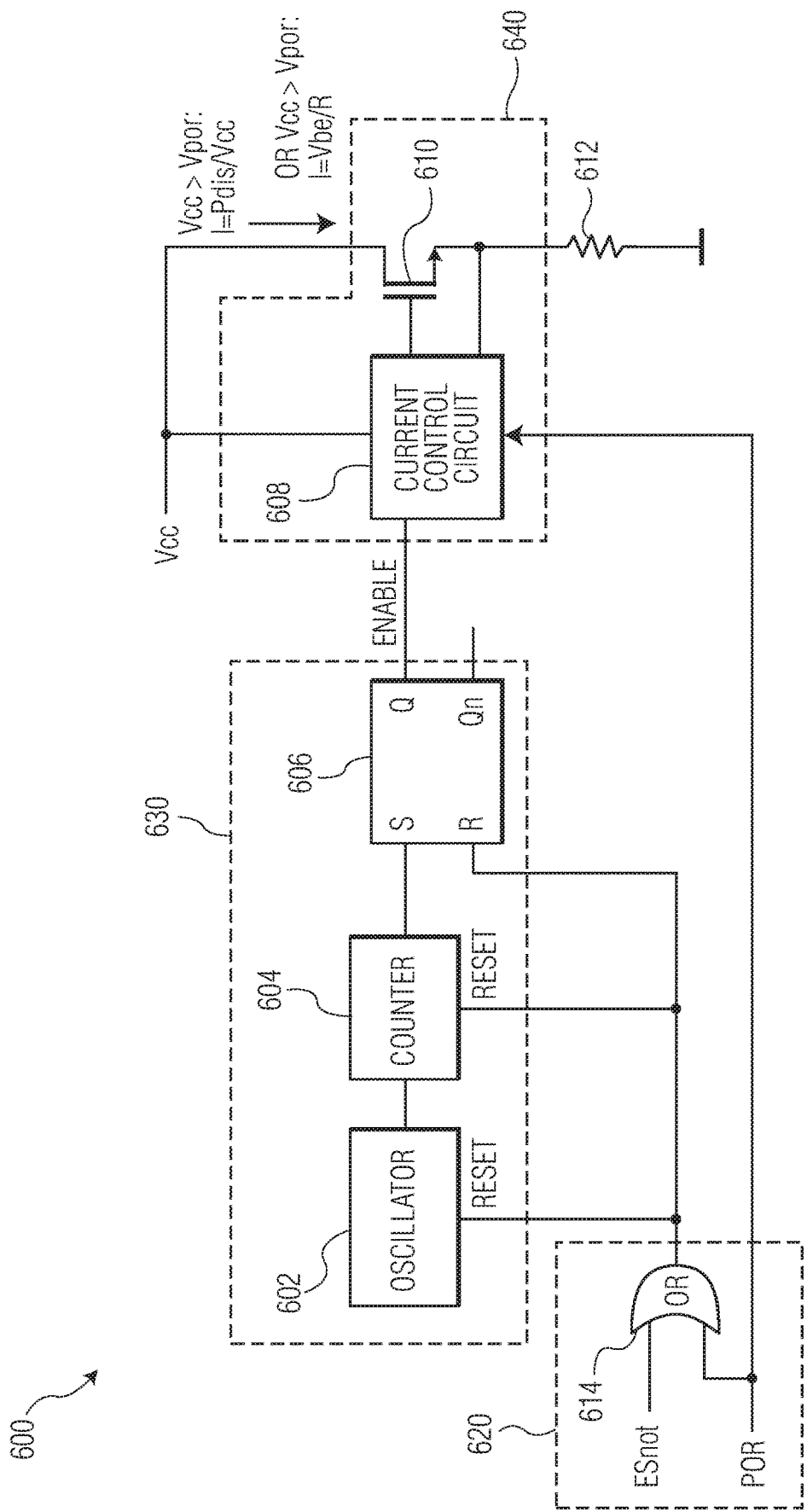
FIG. 6 is a diagram illustrating functional blocks of a discharge circuit implementing a capacitor discharge function.

FIG. 6 is a diagram illustrating functional blocks of a discharge circuit 600 implementing a capacitor discharge function. In an embodiment, the discharge circuit 600 may be implemented within the secondary controller 330 of FIG. 3. During normal operation of a power supply, the discharge circuit 600 is inactive. The discharge circuit 600 activates during discharge of an output capacitor.

As shown in FIG. 6, the discharge circuit 600 may include a low-frequency oscillator 602, an asynchronous counter 604, a latch 606, a current control circuit 608, a discharge transistor 610 (e.g., NMOS transistor), a sense resistor 612, and a logic-OR gate 614. In an embodiment, detecting circuitry 620 may include an energy save function (ESnot) (e.g., residing within the secondary side controller 330) and/or the logic-OR gate 614. The ESnot turns on (activates) if no activity is detected at the drains of the synchronous rectification switching circuitry 340 (e.g., switch 312 and switch 314). In an example, if the ESnot senses no switching activity for a predetermined time (e.g., 100 us), then the ESnot may feed an indication signal to the logic-OR gate 614. The indication signal annuls a reset of the oscillator 602, the counter 604, and the latch 606, and the oscillator 602 starts running.

In an embodiment, a delay time for activating the capacitor discharge function (after the mains voltage disconnect is detected) is facilitated by determining circuitry 630 to minimize device silicon area. The determining circuitry 630 includes the low-frequency oscillator 602, the asynchronous counter 604, and the latch 606. The oscillator 602 may operate according to an example frequency of 1500 Hz. The oscillator 602 may start running during an energy save state or mode. For SR controllers without an energy save mode, the oscillator 602 may start running after a last switching cycle. Capacitor discharge may begin after the counter 604 counts 2048 cycles of ¹⁄₁₅₀₀ seconds. As such, a delay time of approximately 1.36 seconds (2048 cycles*1500 Hz=2048/1500 seconds≈1.36 seconds) may be realized before the discharge function is activated. Thereafter, the counter 604 sets a latch 606 and the output of the latch 606 enables a discharge current that flows through discharging circuitry 640 (e.g., the current control circuit 608 and the discharge transistor 610) and discharges an output capacitor (e.g., Cout 322).

In an embodiment, the current control circuit 608 may sense a supply voltage (Vcc voltage) and use a gain cell to facilitate a constant power discharge. For a Vcc voltage greater than the POR voltage level (Vpor), the discharge current flowing through the discharge transistor 610 may have a hyperbolic relationship with the Vcc voltage. For example, when Vcc is greater than Vpor, the discharge current Idischarge=Pdischarge/Vcc.

For a Vcc voltage less than the Vpor, the discharge current flowing through the discharge transistor 610 may be defined in a rudimentary way so that discharge may occur when Vcc is below the Vpor (e.g., down to a minimum voltage level less than 1 V). For example, when Vcc is less than Vpor, the discharge current Idischarge may be defined based on a base-emitter voltage (Vbe) over the sense resistor 612: Idischarge=Vbe/R. In other examples, when Vcc is less than Vpor, the discharge current Idischarge may be a resistive discharge current or a discharge current that reduces with a lower supply voltage (below Vcc≈3V, circuit limitations may reduce a real discharge current).

The embodiments described herein can be applied, for example, in switch mode power supplies as used for chargers and adapters, and in power supplies as used for desktop computers and television sets with a power indicator that should turn-off rapidly or with an output that should return to 0 V rapidly after being disconnected from the mains voltage.

Figure 7:
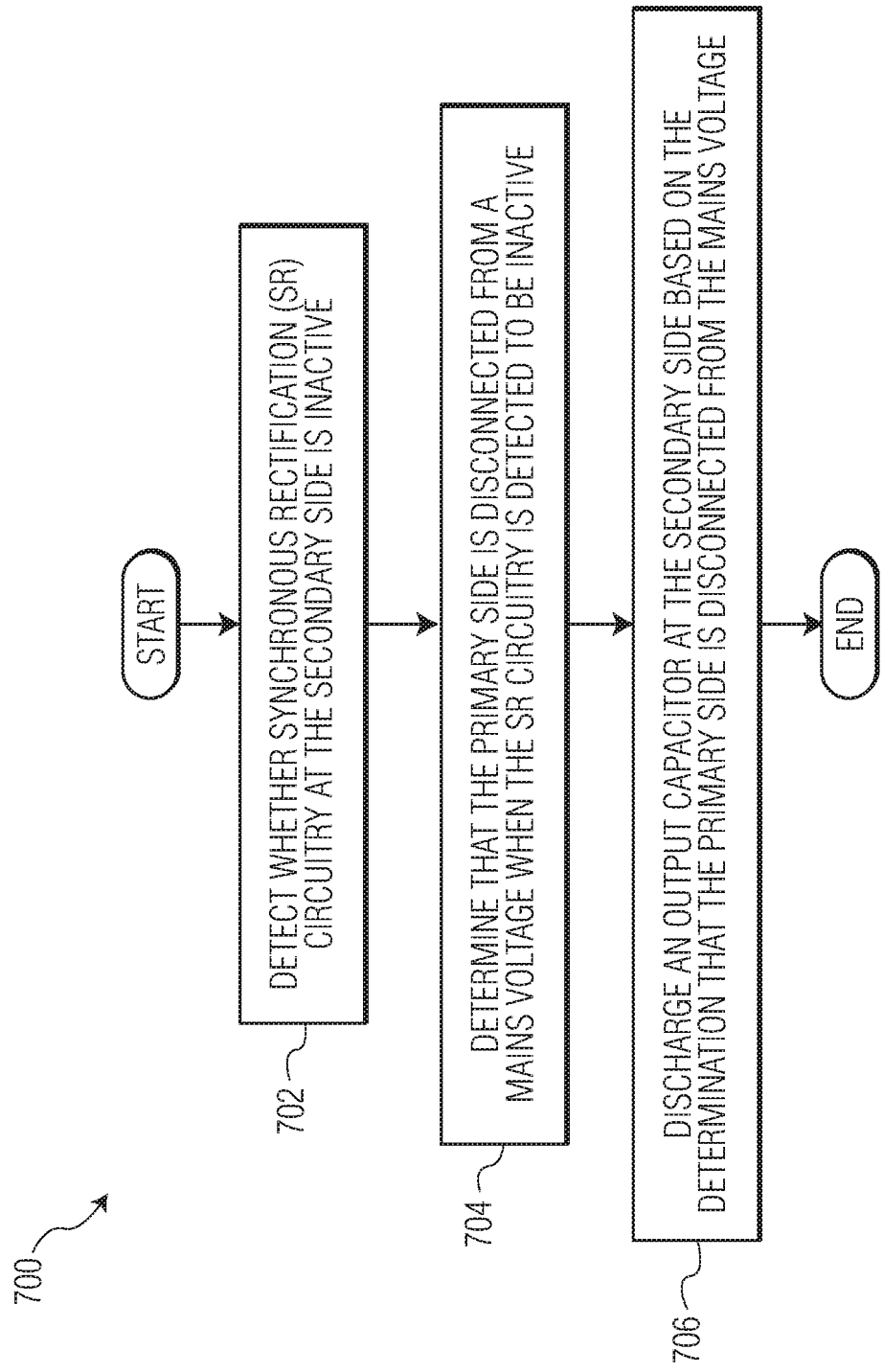
FIG. 7 is a process flow diagram of an example method for discharging an output capacitor of a power supply

FIG. 7 is a process flow diagram 700 of an example method for discharging an output capacitor of a power supply. The power supply includes a primary side for receiving a signal to be converted and a secondary side for outputting a converted signal. In an embodiment, at block 702, the method detects whether synchronous rectification (SR) circuitry (e.g., SR switching circuitry 340 including switch 312 and switch 314) at the secondary side is inactive. For example, the detection of whether the SR circuitry at the secondary side is inactive is performed by detecting circuitry 620 (e.g., energy save function (ESnot) within the secondary side controller 330).

At block 704, the method determines that the primary side is disconnected from a mains voltage when the SR circuitry is detected to be inactive. For example, the determination that the primary side is disconnected from the mains voltage when the SR circuitry is detected to be inactive is performed by determining circuitry 630 (e.g., low-frequency oscillator 602, asynchronous counter 604, and latch 606). In an embodiment, the method determines the primary side to be disconnected from the mains voltage when the SR circuitry performs no switching activity for a predetermined duration (e.g., 1 second).

At block 706, the method discharges an output capacitor (e.g., Cout 322) at the secondary side based on the determination that the primary side is disconnected from the mains voltage. For example, the discharging of the output capacitor at the secondary side based on the determination that the primary side is disconnected from the mains voltage is performed by discharging circuitry 640 (e.g., current control circuit 608 and discharge transistor 610). In an embodiment, the method discharges the output capacitor by detecting an amount of time that the SR circuitry performs no switching activity and discharging the output capacitor when the amount of time exceeds a threshold (e.g., 1.4 seconds). In an embodiment, a current for discharging the output capacitor decreases at a high junction temperature (junction temperature equal to or greater than a threshold temperature, e.g., 150° C. or greater) to avoid overheating a controller (e.g., current control circuit 608 or secondary side controller 330).

In an embodiment, the method discharges the output capacitor by a constant power load. In another embodiment, the method discharges the output capacitor by a constant current load. In a further embodiment, the method discharges the output capacitor by a resistor load. In yet another embodiment, the method discharges the output capacitor by a power load, a current load, a resistor load, or any combination thereof, dependent on an output voltage and temperature.

The above-described operations of a power supply for discharging an output capacitor can be implemented in hardware, firmware, or a combination thereof, or implemented in a combination of hardware and software, or implemented in a combination of firmware and software, or implemented in a combination of hardware, firmware, and software.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for discharging an output capacitor of a power supply, the power supply having a primary side configured to receive a signal to be converted and a secondary side configured to output a converted signal, the method comprising:
   detecting that the synchronous rectification (SR) circuitry at the secondary side is inactive after no switching activity is sensed for a predetermined time at drains of the SR circuitry;
   determining that the primary side is disconnected from a mains voltage after the SR circuitry is detected to be inactive; and
   discharging an output capacitor at the secondary side based on the determination that the primary side is disconnected from the mains voltage.

2. The method of claim 1, wherein the primary side is determined to be disconnected from the mains voltage when the SR circuitry performs no switching activity for a predetermined duration.

3. The method of claim 2, wherein discharging the output capacitor comprises:
   detecting an amount of time that the SR circuitry performs no switching activity; and
   discharging the output capacitor when the amount of time exceeds a threshold.

4. The method of claim 1, wherein the output capacitor is discharged by a constant power load.

5. The method of claim 1, wherein the output capacitor is discharged by a constant current load.

6. The method of claim 1, wherein the output capacitor is discharged by a resistor load.

7. The method of claim 1, wherein the output capacitor is discharged by at least one of a power load, a current load, a resistor load, or any combination thereof.

8. The method of claim 1, wherein a current for discharging the output capacitor decreases at a high junction temperature.

9. A power supply, comprising:
a primary side configured to connect to a mains voltage and receive a voltage signal to be converted;
a secondary side configured to output a converted voltage signal; and
a transformer connected between the primary side and the secondary side and configured to convert the voltage signal, wherein the secondary side comprises:
an output capacitor,
synchronous rectification (SR) circuitry configured to rectify the converted voltage signal from the transformer,
detection circuitry configured to detect that the SR circuitry is inactive after no switching activity is sensed for a predetermined time at drains of the SR circuitry,
determining circuitry configured to determine that the primary side is disconnected from the mains voltage after the SR circuitry is detected to be inactive, and
discharging circuitry configured to discharge the output capacitor based on the determination that the primary side is disconnected from the mains voltage.

10. The power supply of claim 9, wherein the determining circuitry is configured to determine that the primary side is disconnected from the mains voltage when the SR circuitry performs no switching activity for a predetermined duration.

11. The power supply of claim 10, wherein the discharging circuitry is configured to:
detect an amount of time that the SR circuitry performs no switching activity; and
discharge the output capacitor when the amount of time exceeds a threshold.

12. The power supply of claim 9, wherein the output capacitor is discharged by a constant power load.

13. The power supply of claim 9, wherein the output capacitor is discharged by a constant current load.

14. The power supply of claim 9, wherein the output capacitor is discharged by a resistor load.

15. The power supply of claim 9, wherein the output capacitor is discharged by at least one of a power load, a current load, a resistor load, or any combination thereof.

16. The power supply of claim 9, wherein a current for discharging the output capacitor decreases at a high junction temperature.

17. The power supply of claim 9, wherein the discharging circuitry sets a delay time that is longer than a maximum time of a non-switching portion of a burst mode or of a low frequency mode whereby discharge is not triggered during no-load operation.

18. The power supply of claim 9, wherein the detection circuitry is configured to detect the mains voltage disconnect at the secondary side without a communication signal from the primary side.

19. A power supply, comprising:
a primary side configured to connect to an input voltage and receive a voltage signal to be converted; and
a secondary side configured to output a converted voltage signal, the secondary side comprising a controller configured to:
detect that synchronous rectification (SR) circuitry at the secondary side is inactive after no switching activity is sensed for a predetermined time at drains of the SR circuitry,
determine that the primary side is disconnected from the input voltage after the SR circuitry is detected to be inactive, and
discharge an output capacitor at the secondary side based on the determination that the primary side is disconnected from the input voltage.

20. The power supply of claim 19, wherein the controller is configured to determine that the primary side is disconnected from the input voltage when the SR circuitry performs no switching activity for a predetermined duration.

21. The power supply of claim 20, wherein the controller configured to discharge the output capacitor is further configured to:
detect an amount of time that the SR circuitry performs no switching activity; and
discharge the output capacitor when the amount of time exceeds a threshold.

22. The power supply of claim 19, wherein the controller is configured to discharge the output capacitor by at least one of a power load, a current load, a resistor load, or any combination thereof.

* * * * *